(12) United States Patent
Okubo

(10) Patent No.: US 11,215,278 B2
(45) Date of Patent: Jan. 4, 2022

(54) VEHICLE AND METHOD FOR CONTROLLING SAME

(71) Applicant: TOYOTA JIDOSHA KABUSHIKI KAISHA, Toyota (JP)

(72) Inventor: Tadanao Okubo, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/939,510

(22) Filed: Jul. 27, 2020

(65) Prior Publication Data

US 2021/0123525 A1  Apr. 29, 2021

(30) Foreign Application Priority Data

Oct. 29, 2019  (JP) .............................. JP2019-195937

(51) Int. Cl.
| | | |
|---|---|---|
| *F16H 59/18* | (2006.01) | |
| *F16H 59/60* | (2006.01) | |
| *F16H 59/44* | (2006.01) | |
| *F16H 59/54* | (2006.01) | |
| *F16H 59/70* | (2006.01) | |
| F16H 61/16 | (2006.01) | |
| F16H 59/36 | (2006.01) | |

(52) U.S. Cl.
CPC ............. *F16H 59/18* (2013.01); *F16H 59/44* (2013.01); *F16H 59/54* (2013.01); *F16H 59/60* (2013.01); *F16H 59/70* (2013.01); F16H 2059/366 (2013.01); F16H 2059/706 (2013.01); F16H 2061/163 (2013.01)

(58) Field of Classification Search
CPC .......... F16H 59/18; F16H 59/44; F16H 59/54; F16H 59/70; F16H 2059/366; F16H 2061/163; F16H 59/60; Y10T 477/675

USPC .......................................................... 701/65
See application file for complete search history.

(56) References Cited

U.S. PATENT DOCUMENTS

2010/0100293 A1* 4/2010 Takanami ........... F16H 61/0213
701/65
2019/0249768 A1* 8/2019 Kishi .................. F16H 61/0213
(Continued)

FOREIGN PATENT DOCUMENTS

| CN | 101622477 A | 1/2010 |
|---|---|---|
| CN | 109790920 A | 5/2019 |

(Continued)

OTHER PUBLICATIONS

English translation of KR2003001835A; http://translationportal.epo.org; May 12, 2021 (Year: 2021).*

*Primary Examiner* — Roger L Pang
(74) *Attorney, Agent, or Firm* — Oliff PLC

(57) ABSTRACT

The disclosure provides a vehicle and a method for controlling the vehicle. The vehicle includes: an engine; a transmission configured to transmit power from the engine to drive wheels; a deceleration factor detection device configured to detect a deceleration factor that is present ahead of the vehicle; and an electronic control unit configured to maintain a speed ratio of the transmission as a current speed ratio on condition that the deceleration factor is detected by the deceleration factor detection device, and change the speed ratio stepwise to a lower speed side than the current speed ratio and maintain the changed speed ratio, in response to a deceleration request from a driver.

10 Claims, 4 Drawing Sheets

(56) References Cited

U.S. PATENT DOCUMENTS

2021/0062913 A1* 3/2021 Kakihara ................ F16H 59/44
2021/0088131 A1* 3/2021 Ooshima ............. F16H 61/0213

FOREIGN PATENT DOCUMENTS

GB          2282861 A  *  4/1995  ............. F16H 61/21
JP       H05-280623 A     10/1993
KR      20030018335 A  *  3/2003

* cited by examiner

VEHICLE AND METHOD FOR CONTROLLING SAME

CROSS-REFERENCE TO RELATED APPLICATION

This application claims priority to Japanese Patent Application No. 2019-195937 filed on Oct. 29, 2019, incorporated herein by reference in its entirety.

BACKGROUND

1. Technical Field

The disclosure relates to vehicles including an engine, a transmission that transmits power from the engine to drive wheels, and a deceleration factor detection device that detects a deceleration factor that is present ahead of the vehicle, and a method for controlling the vehicle.

2. Description of Related Art

A control device for an automatic transmission is conventionally known which uses input information of road images to control shift points of the automatic transmission in order to reduce the number of unnecessary shifting operations and improve driving feel (see, for example, Japanese Unexamined Patent Application Publication No. 05-280623 (JP 05-280623 A)). This control device prohibits upshifting of the automatic transmission when a road structure perception device determines, based on captured image information received from a camera, that the distance between the vehicle and a deceleration factor located ahead of the vehicle is equal to or smaller than a critical distance and the driver has released an accelerator pedal.

SUMMARY

Even when upshifting of the transmission is prohibited according to the distance to a deceleration factor ahead of the vehicle as described above, the transmission may downshift during the subsequent reacceleration and therefore the vehicle may not be able to be smoothly accelerated. A possible solution to this is to change the speed ratio of the transmission to the lower speed side (downshift side) (increase the reduction ratio) in order to prepare for the subsequent reacceleration when there is a deceleration factor ahead of the vehicle. However, in the case where the camera etc. is used to detect a deceleration factor ahead of the vehicle, a deceleration factor may be erroneously perceived although there is no deceleration factor ahead of the vehicle. When the speed ratio of the transmission is changed to the lower speed side with a deceleration factor, which is not actually present ahead of the vehicle, being erroneously perceived, the driver may feel discomfort due to an increase in deceleration.

The disclosure provides a vehicle and a control method that allows the vehicle to be smoothly accelerated in response to a reacceleration request that is made after a deceleration factor ahead of the vehicle disappears and that does not make the driver feel discomfort when a deceleration factor is erroneously perceived.

A first aspect of the disclosure relates to a vehicle including: an engine; a transmission configured to transmit power from the engine to a drive wheel; a deceleration factor detection device configured to detect a deceleration factor that is present ahead of the vehicle; and an electronic control unit. The electronic control unit is configured to maintain a speed ratio of the transmission as a current speed ratio on condition that the deceleration factor is detected by the deceleration factor detection device, and change the speed ratio of the transmission stepwise to a lower speed side than the current speed ratio and maintain the changed speed ratio, in response to a deceleration request from a driver.

In the vehicle of the first aspect of the disclosure, the speed ratio of the transmission is maintained as the current speed ratio on the condition that a deceleration factor that is present ahead of the vehicle is detected by the deceleration factor detection device. When the driver makes a deceleration request after detection of the deceleration factor ahead of the vehicle, the speed ratio of the transmission is changed stepwise to the lower speed side than the current speed ratio and the changed speed ratio is maintained. This configuration makes it possible to suppress a change of the speed ratio of the transmission to the lower speed side when the vehicle is reaccelerated after the deceleration factor ahead of the vehicle disappears. Even when the deceleration factor detection device erroneously perceives a deceleration factor, the speed ratio of the transmission is maintained as the current speed ratio unless deceleration of the vehicle is requested by the driver. This makes it possible to suppress an increase in deceleration even though deceleration of the vehicle is not requested by the driver. Consequently, this configuration allows the vehicle of the disclosure to be smoothly accelerated in response to a reacceleration request that is made after the deceleration factor ahead of the vehicle disappears, and makes it possible to avoid giving the driver a feel of discomfort when a deceleration factor is erroneously perceived.

In the vehicle of the first aspect, the electronic control unit may be configured to change the speed ratio stepwise to the lower speed side than the current speed ratio such that a rotational speed of the engine after the speed ratio is changed becomes equal to or lower than a predetermined first threshold. The vehicle with the above configuration makes it possible to satisfactorily avoid giving the driver a feel of discomfort by suppressing an excessive increase in the rotational speed of the engine with the change in speed ratio to the lower speed side.

In the vehicle of the first aspect, the transmission may be a stepped transmission. The electronic control unit may be configured to maintain a shift speed of the transmission as a current shift speed on the condition that the deceleration factor is detected by the deceleration factor detection device, change the shift speed to at least one shift speed lower than the current shift speed regardless of whether a predetermined downshift condition is satisfied, in response to the deceleration request from the driver, and maintain the changed shift speed.

In the vehicle of the first aspect, the electronic control unit may be configured to change the shift speed to a minimum shift speed at which the rotational speed of the engine is equal to or lower than the first threshold, in response to the deceleration request that is made by the driver under a predetermined condition. According to the vehicle with the above configuration, a shift speed at which the vehicle can be smoothly accelerated in response to a reacceleration request that is made after the deceleration factor ahead of the vehicle disappears can be quickly established.

In the vehicle of the first aspect, the electronic control unit may be configured to terminate maintenance of the speed ratio when the rotational speed of the engine becomes equal to or higher than a second threshold after the speed ratio is maintained as the current speed ratio, the second threshold being higher than the first threshold. The vehicle with the above configuration makes it possible to avoid giving the driver a feel of discomfort by suppressing an increase in the rotational speed of the engine due to the speed ratio on the lower speed side than the current speed ratio being maintained.

In the vehicle of the first aspect, the electronic control unit may be configured to maintain the speed ratio as the current speed ratio on condition that the rotational speed of the engine is equal to or lower than a third threshold when the deceleration factor is detected by the deceleration factor detection device, the third threshold being higher than the first threshold and lower than the second threshold. The vehicle with the above configuration makes it possible to avoid giving the driver a feel of discomfort by suppressing an increase in the rotational speed of the engine due to the current speed ratio being maintained.

In the vehicle of the first aspect, the electronic control unit may be configured to terminate maintenance of the speed ratio when the driver depresses an accelerator pedal for a predetermined time or longer after the speed ratio is maintained as the current speed ratio. The vehicle with the above configuration makes it possible to suppress a change of the speed ratio of the transmission to a higher speed side in the case where the deceleration factor detection device erroneously perceives that the deceleration factor has disappeared before the driver makes a reacceleration request.

In the vehicle of the first aspect, the deceleration request may be depression of a brake pedal by the driver.

In the vehicle of the first aspect, the deceleration request may be release of the accelerator pedal by the driver at a predetermined vehicle speed or higher.

A second aspect of the disclosure relates to a method for controlling a vehicle including an engine, a transmission configured to transmit power from the engine to a drive wheel, and a deceleration factor detection device configured to detect a deceleration factor present ahead of the vehicle. The method includes: maintaining a speed ratio of the transmission as a current speed ration on condition that the deceleration factor is detected by the deceleration factor detection device; and changing the speed ratio of the transmission stepwise to a lower speed side than the current speed ratio and maintaining the changed speed ratio, in response to a deceleration request from a driver.

The method for controlling the vehicle of the second aspect allows the vehicle to be smoothly accelerated in response to a reacceleration request that is made after the deceleration factor ahead of the vehicle disappears, and also makes it possible to avoid giving the driver a feel of discomfort when a deceleration factor is erroneously perceived.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle and a method for controlling the vehicle according to an embodiment of the disclosure will be described with reference to the accompanying drawings.

Figure 1:
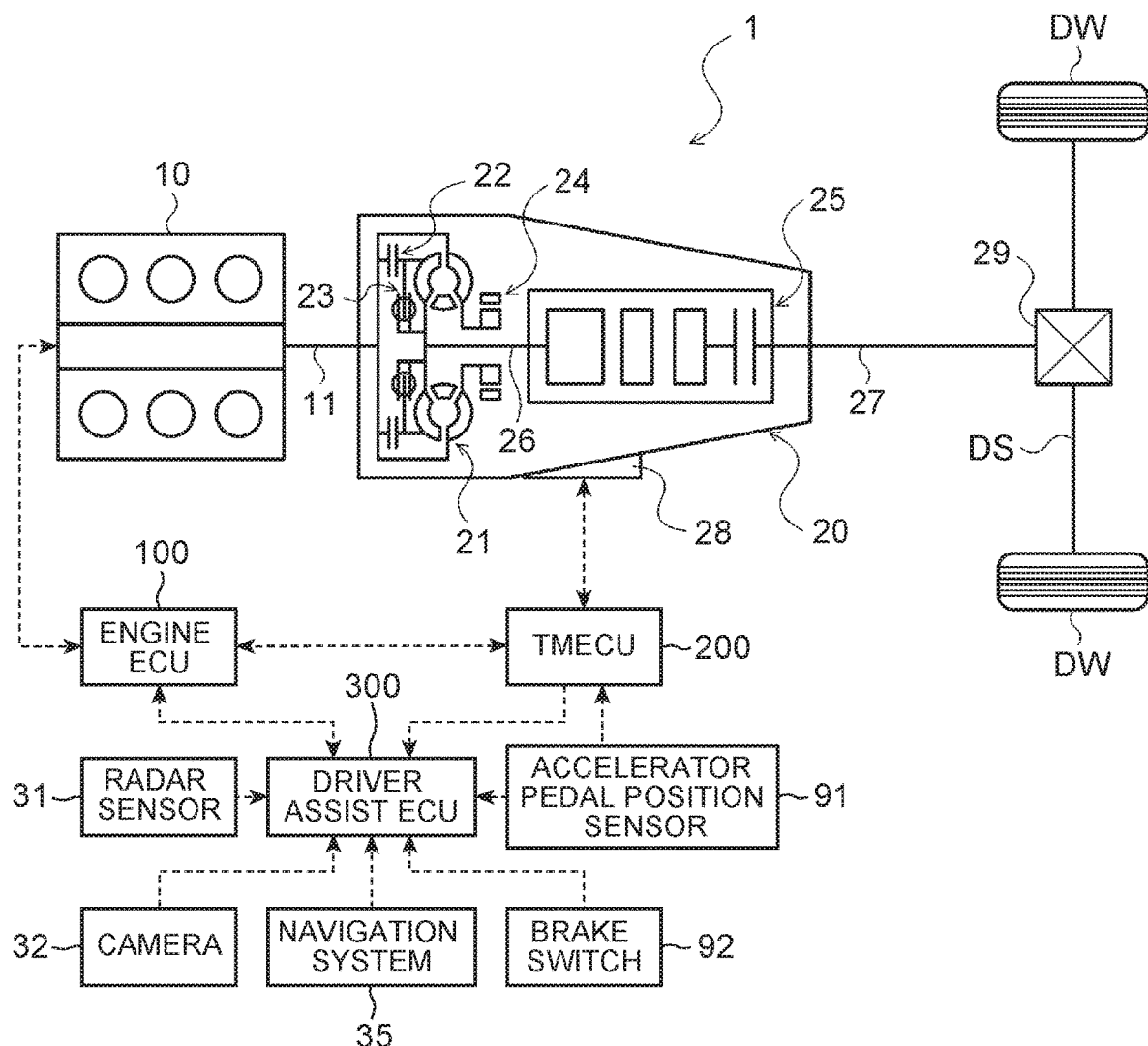
FIG. 1 is a schematic configuration diagram of a vehicle according to an embodiment of the disclosure.

FIG. 1 is a schematic configuration diagram of a vehicle 1 according to a first embodiment of the disclosure. The vehicle 1 shown in FIG. 1 includes an internal combustion engine (hereinafter referred to as the "engine") 10, an engine electronic control unit (hereinafter referred to as the "engine ECU") 100, a power transmission device 20, and a transmission electronic control unit (hereinafter referred to as the "TMECU") 200. The engine 10 includes a plurality of combustion chambers (cylinders). The engine ECU 100 controls the engine 10. The power transmission device 20 transmits power from the engine 10 to drive wheels DW. The TMECU 200 sends and receives information to and from the engine ECU 100 to control the power transmission device 20. The vehicle 1 may be a rear-wheel-drive vehicle as shown in FIG. 1, or may be a front-wheel-drive vehicle or a four-wheel-drive vehicle.

The engine 10 is a gasoline engine that burns a mixture of gasoline (hydrocarbon fuel) and air in the plurality of combustion chambers to convert reciprocating motion of pistons associated with combustion of the mixture to a rotating motion of a crankshaft 11. The engine 10 may be a diesel engine or an LPG engine. The engine ECU 100 that controls the engine 10 includes a microcomputer having a CPU, a ROM, a RAM, an input and output interface, etc., various drive circuits, various logic ICs, etc., which are not shown. The engine ECU 100 executes intake air amount control, fuel injection control, ignition timing control, etc. of the engine 10. The engine ECU 100 also calculates a rotational speed Ne of the engine 10 (crankshaft 11) based on the crank position obtained from a crank angle sensor, not shown.

The power transmission device 20 includes a torque converter (fluid transmission device) 21 having a torque amplification function, a lockup clutch 22, a damper mechanism 23, a mechanical oil pump 24, a transmission 25, a hydraulic control device 28 that controls a hydraulic oil pressure. The torque converter 21 includes a pump impeller, a turbine runner, and a stator. The pump impeller is connected to the crankshaft 11 of the engine 10 via a front cover (input member). The turbine runner is connected to an input shaft 26 of the transmission 25. The stator redirects the flow of hydraulic oil from the turbine runner toward the pump impeller to amplify torque. The lockup clutch 22 is a multi-plate or single-plate friction hydraulic clutch that connects and disconnects the front cover to and from the input shaft 26 of the transmission 25 via the damper mechanism 23.

The transmission 25 is a multi-stage (stepped) transmission, for example, a 6- to 10-speed transmission (in the present embodiment, an 8-speed transmission), which includes the input shaft 26, an output shaft 27, a plurality of planetary gears, and a plurality of clutches and a plurality of brakes (shift engagement elements). The transmission 25 may be a dual-clutch transmission. The transmission 25 changes the speed of the power transmitted from the crankshaft 11 of the engine 10 to the input shaft 26 via either the torque converter 21 or the lockup clutch 22 in a plurality of stages to output the power with the changed speed from the output shaft 27 to the drive wheels DW via a differential gear set 29 and drive shafts DS. The hydraulic control device 28 includes a valve body having a plurality of oil passages formed therein, a plurality of regulator valves, a plurality of linear solenoid valves, etc.

The TMECU 200 that controls the power transmission device 20 includes a microcomputer having a CPU, a ROM, a RAM, an input and output interface, etc., various drive circuits, various logic ICs, etc., which are not shown. The TMECU 200 controls the hydraulic control device 28 so as to control an oil pressure from the mechanical oil pump 24 to supply the oil pressure to the torque converter 21, the lockup clutch 22, the clutches and the brakes of the transmission 25, etc. The TMECU 200 also obtains from a speed change diagram prepared in advance a target shift speed corresponding to an accelerator operation amount Acc (the amount of depression of an accelerator pedal, not shown) detected by an accelerator pedal position sensor 91 and a vehicle speed V detected by a vehicle speed sensor, not shown, when the transmission 25 upshifts or downshifts. The TMECU 200 controls the hydraulic control device 28 such that the obtained target shift speed is established.

As shown in FIG. 1, the vehicle 1 further includes a radar sensor (e.g., a millimeter wave radar) 31 mounted in a front part of the vehicle 1, a camera (monocular camera) 32 mounted on a windshield etc. of the vehicle 1, a plurality of sonar sensors (blind spot sensors) mounted on the four corners etc. of the vehicle 1, and a driver assist electronic control unit (hereinafter referred to as the "driver assist ECU") 300. The driver assist ECU 300 includes a microcomputer having a CPU, a ROM, a RAM, an input and output interface, etc. The driver assist ECU 300 sends and receives information to and from the engine ECU 100 and the TMECU 200.

The driver assist ECU 300 executes, together with the engine ECU 100 and the TMECU 200, driver assist control (user assist control) for assisting the driver in driving the vehicle 1, based on an accelerator operation amount Acc from the accelerator pedal position sensor 91, a signal from a brake switch 92, a vehicle speed (speed of the vehicle 1) V from the vehicle speed sensor, signals from the radar sensor 31, the camera 32, and the sonar sensors. The driver assist control includes damage mitigation brake control, cruise control, lane keep assist control, electronic stability control, parking support, rear-side vehicle detection, drive-start control, detection of vehicles and obstacles (including humans) that are present in blind spots, etc.

The driver assist ECU 300 constitutes, together with the radar sensor 31 and the camera 32, a deceleration factor detection device. The deceleration factor detection device is a device that detects a deceleration factor such as a preceding vehicle traveling ahead of the vehicle 1 or a curve ahead. That is, the driver assist ECU 300 calculates a degree of closeness Kp of the vehicle 1 to the preceding vehicle as given by, for example, Kp={α·V+Vr}/D (where "α" is a predetermined coefficient), based on a relative speed Vr to the preceding vehicle (the speed obtained by subtracting the speed of the vehicle 1 from the speed of the preceding vehicle) and the distance D between the preceding vehicle and the vehicle 1, which are detected by the radar sensor 31, and the vehicle speed V. The degree of closeness Kp is a negative value. As the degree of closeness Kp becomes closer to zero, the vehicle 1 and the preceding vehicle are farther separated from each other. As the degree of closeness Kp becomes smaller (as an absolute value of the degree of closeness Kp becomes larger), the vehicle 1 is more approaching the preceding vehicle. The degree of closeness Kp may be calculated using an expression etc. other than the above expression.

The driver assist ECU 300 also calculates a radius of a curve ahead of the vehicle 1, the distance to the curve, and a recommended vehicle speed at the curve corresponding to predetermined lateral acceleration (lateral G), based on an image of white lane markings on the road that is obtained by the camera 32. The driver assist ECU 300 also calculates deceleration required to reduce the vehicle speed (current vehicle speed) V to the recommended vehicle speed. The radius of a curve ahead of the vehicle 1 and the distance to the curve may be calculated based on information from a navigation system 35.

Figure 2:
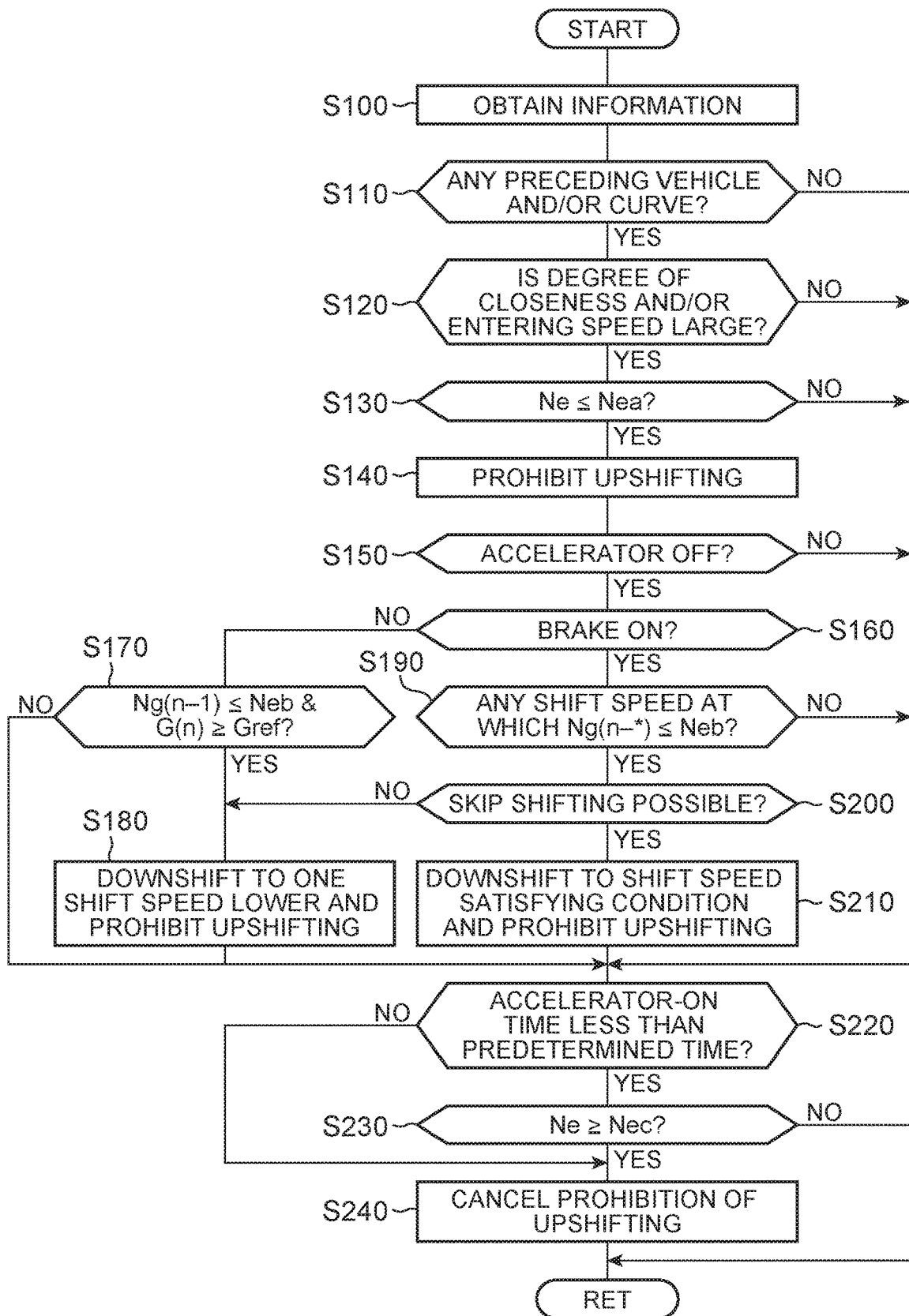
FIG. 2 is a flowchart of a control routine that is executed in the vehicle of FIG. 1.
Figure 3:
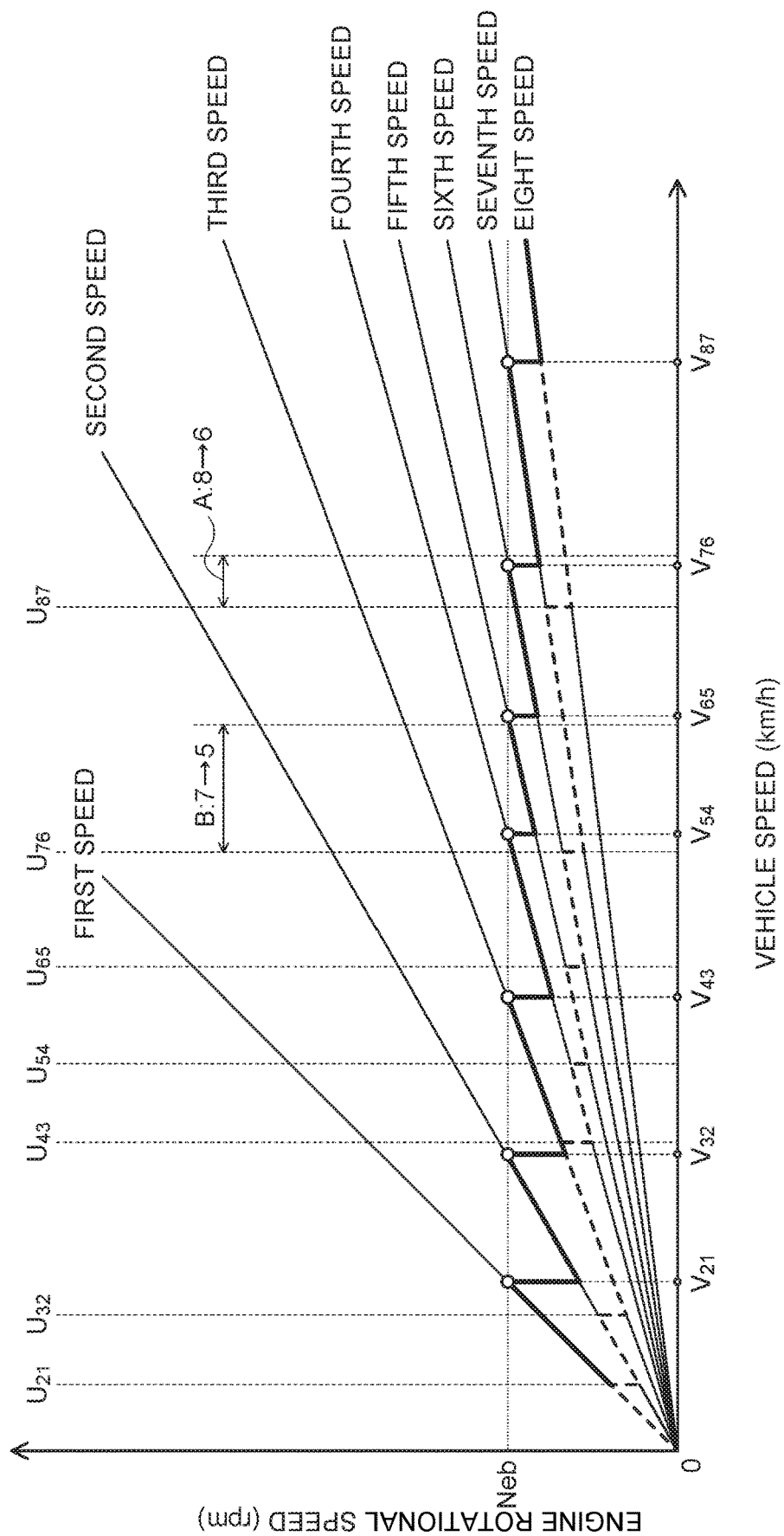
FIG. 3 illustrates a condition for changing the speed ratio of the vehicle to the lower speed side during execution of the control routine of FIG. 2.
Figure 4:
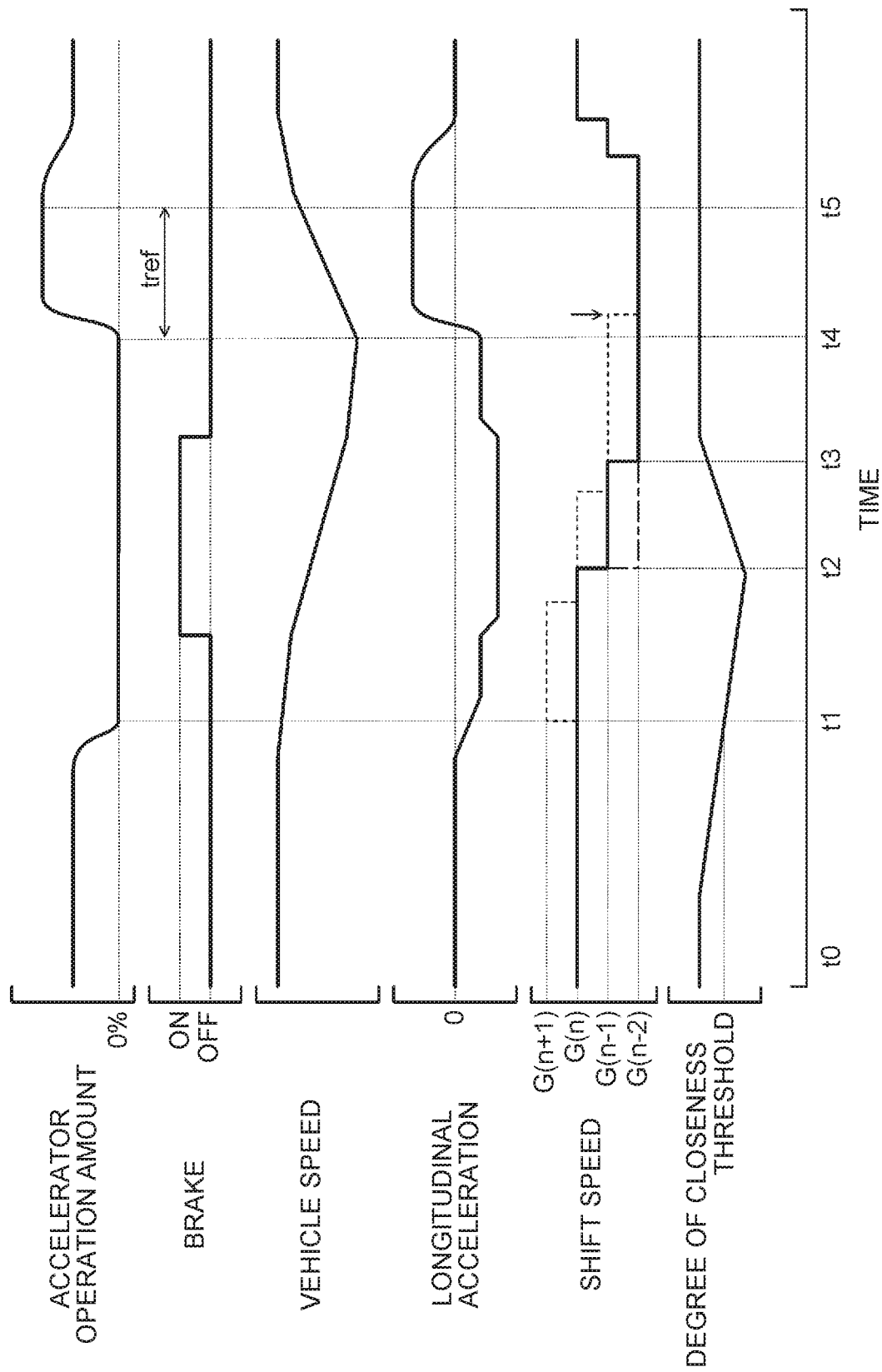
FIG. 4 is a timing chart illustrating how an accelerator pedal operation, a brake operation, a vehicle speed, longitudinal acceleration, a shift speed, and the degree of closeness change during execution of the control routine of FIG. 2.

Next, how the vehicle 1 operates when any deceleration factor such as a preceding vehicle or a curve is detected ahead of the vehicle 1 will be described with reference to FIGS. 2, 3, and 4. FIG. 2 is a flowchart illustrating an example of a control routine that is repeatedly executed by the driver assist ECU 300 at predetermined intervals while the vehicle 1 is traveling.

At the start of the routine of FIG. 2, the driver assist ECU 300 obtains information required for control, such as the vehicle speed V from the vehicle speed sensor, the accelerator operation amount Acc from the accelerator pedal position sensor 91, the rotational speed Ne of the engine 10 from the engine ECU 100, a current shift speed G(n) of the transmission 25 from the TMECU 200 (where "n" is an integer of 1 to 8 in the present embodiment), a value of a brake flag, and ahead-of-vehicle information (step S100). The brake flag is a flag that is set to 1 while a signal indicating that the driver is depressing a brake pedal, not shown, is being sent from the brake switch 92. The ahead-of-vehicle information includes whether there is any deceleration factor such as a preceding vehicle or a curve, the degree of closeness Kp, deceleration required to reduce the vehicle speed V to the recommended vehicle speed at the curve, etc. The driver assist ECU 300 then determines whether at least one of a preceding vehicle and a curve is present ahead of the vehicle 1, namely whether there is any deceleration factor ahead of the vehicle 1, based on the ahead-of-vehicle information obtained in step S100 (step S110).

When the driver assist ECU 300 determines in step S110 that there is a deceleration factor ahead of the vehicle 1 (step S110: YES), the driver assist ECU 300 determines based on the degree of closeness Kp and the deceleration obtained in step S100 whether at least one of the degree of closeness of the vehicle 1 to the preceding vehicle and the speed at which the vehicle 1 enters the curve is large (step S120). When the degree of closeness Kp obtained in step S100 is equal to or smaller than a predetermined threshold (negative value), the driver assist ECU 300 determines in step S120 that the degree of closeness of the vehicle 1 to the preceding vehicle is large. When the deceleration obtained in step S100 is equal to or higher than a predetermined threshold, the driver assist ECU 300 determines in step S120 that the speed at which the vehicle 1 enters the curve is large. When the driver assist ECU 300 determines in step S120 that at least one of the degree of closeness of the vehicle 1 to the preceding vehicle and the speed at which the vehicle 1 enters the curve is large (step S120: YES), the driver assist ECU 300 determines whether the rotational speed Ne of the engine 10 obtained in step S100 is equal to or lower than a predetermined upshift prohibition maximum rotational speed (third threshold) Nea (step S130). The upshift prohibition maximum rotational speed Nea is predetermined as a rotational speed that does not make an occupant of the vehicle 1 feel discomfort due to a change in engine sound when the vehicle 1 is decelerated with the shift speed of the transmission 25 being maintained. In the present embodiment, the upshift prohibition maximum rotational speed Nea is a fixed value, for example, about 2000 rpm.

When the driver assist ECU 300 determines in step S130 that the rotational speed Ne of the engine 10 is equal to or lower than the upshift prohibition maximum rotational speed Nea (step S130: YES), the driver assist ECU 300 sends an upshift prohibition signal to the TMECU 200 in order to prohibit upshifting to a shift speed higher than the current shift speed G(n) (step S140). In response to the upshift prohibition signal received from the driver assist ECU 300, the TMECU 200 maintains the shift speed of the transmission 25 as the current shift speed G(n) and does not change the shift speed to a shift speed higher than the current shift speed G(n) until the prohibition of upshifting is canceled. After step S140, the driver assist ECU 300 determines whether the driver has released the accelerator pedal, based on the accelerator operation amount Acc obtained in step S100 (step S150).

When the driver assist ECU 300 determines in step S150 that the driver has released the accelerator pedal (step S150: YES), the driver assist ECU 300 determines whether the driver is depressing the brake pedal, based on the value of the brake flag obtained in step S100 (step S160). When the driver assist ECU 300 determines in step S150 that the driver has released the accelerator pedal and determines in step S160 that the driver is not depressing the brake pedal (step S160: NO), the driver assist ECU 300 determines whether it is possible to change (downshift) the shift speed of the transmission 25 to one shift speed lower (step S170).

In step S170, the driver assist ECU 300 calculates, from the vehicle speed V obtained in step S100 and the gear ratio at a shift speed G(n−1) that is one shift speed lower than the current shift speed G(n) of the transmission 25, a rotational speed Ng(n−1) of the engine 10 at the shift speed G(n−1) corresponding to the vehicle speed V. In step S170, the driver assist ECU 300 also determines whether the calculated rotational speed Ng(n−1) is equal to or lower than a predetermined downshift permission maximum rotational speed (first threshold) Neb and determines whether the current shift speed G(n) is equal to or higher than a predetermined downshift permission minimum shift speed.

In the present embodiment, the downshift permission maximum rotational speed Neb is a fixed value that is lower than the upshift prohibition maximum rotational speed Nea by, for example, about 200 rpm. As shown in FIG. 3, a vehicle speed $V_{ii-1}$ at which the rotational speed Ng(n−1) of the engine 10 at a shift speed G(i−1) that is one shift speed lower than each shift speed G(i) of the transmission 25 (where "i" is an integer of 2 to 8 in the present embodiment) is made equal to or lower than the downshift permission maximum rotational speed Neb when the accelerator operation amount Acc is 0% is sufficiently higher than a vehicle speed $U_{ii-1}$ at which the shift speed of the transmission 25 is changed to one shift speed lower according to a downshift line (see the dashed line in the speed change diagram in FIG. 3) when the accelerator operation amount Acc is 0%.

The downshift permission minimum shift speed is predetermined based on a shift speed that does not make the occupant of the vehicle 1 feel discomfort (excessive decelerating feel) due to engine braking when depression of the accelerator pedal (and the brake pedal) by the driver is released (when fuel is cut). More specifically, the downshift permission minimum shift speed is a shift speed (e.g., sixth speed) that is one shift speed higher (the upshift side) than a minimum shift speed at which deceleration (deceleration G) due to friction torque (braking torque) that is transmitted from the engine 10 to which fuel is cut and which rotates at the downshift permission maximum rotational speed Neb to the drive wheels DW via the power transmission device 20 is equal to or smaller than a first value (e.g., about 0.02 G).

When the driver assist ECU 300 determines in step S170 that the rotational speed Ng(n−1) is equal to or lower than the downshift permission maximum rotational speed (first threshold) Neb and the current shift speed G(n) is equal to or higher than the downshift permission minimum shift speed (in the present embodiment, any of the sixth to eighth speeds) (step S170: YES), it changes the shift speed of the transmission 25 to a shift speed G(n−1) that is one shift speed lower than the current shift speed G(n) and sends to the TMECU 200 a command signal for prohibiting upshifting to a shift speed higher than the shift speed G(n−1) (step S180). In response to the command signal received from the driver assist ECU 300, the TMECU 200 controls the hydraulic control device 28 such that the shift speed of the transmission 25 is changed to the shift speed G(n−1), and does not change the shift speed to a shift speed higher than the shift speed G(n−1) until the prohibition of upshifting is canceled.

When the driver assist ECU 300 determines in step S150 that the driver has released the accelerator pedal and determines in step S160 that the driver is depressing the brake pedal (step S160: YES), the driver assist ECU 300 calculates, from the vehicle speed V obtained in step S100 and the gear ratios at a plurality of shift speeds G(n−1), G(n−2), . . . that are lower than the current shift speed G(n), rotational speeds Ng(n−1), Ng(n−2), . . . of the engine 10 at the shift speeds G(n−1), G(n−2), . . . corresponding to the vehicle speed V, and determines whether there is any shift speed at which the rotational speeds Ng(n−1), Ng(n−2), . . . are equal to or lower than the downshift permission maximum rotational speed (first threshold) Neb (step S190).

When the driver assist ECU 300 determines in step S190 that there is a shift speed at which the rotational speeds Ng(n−1), Ng(n−2), . . . are equal to or lower than the downshift permission maximum rotational speed Neb (step S190: YES), the driver assist ECU 300 determines whether downshifting to two or more shift speeds lower, namely what is called skip shifting, is possible (step S200). In step S200, the driver assist ECU 300 determines whether there is a shift speed Gx which is two or more shift speeds lower than the current shift speed G(n) and at which deceleration due to friction torque transmitted from the engine 10 to which fuel is cut and which rotates at the downshift permission maximum rotational speed Neb to the drive wheels DW is equal to or smaller than a second value (e.g., about 0.03 G) larger than the first value. In the present embodiment, as shown in FIG. 3, in the case where the current shift speed G(n) is the eighth speed and the vehicle speed V is within the range A in FIG. 3, the sixth speed is the shift speed Gx and skip shifting from the eighth speed to the sixth speed is permitted. In the case where the current shift speed G(n) is the seventh speed and the vehicle speed V is within the range B in FIG. 3, the fifth speed is the shift speed Gx and skip shifting from the seventh speed to the fifth speed is permitted.

When the driver assist ECU 300 determines in step S200 that downshifting to two or more shift speeds lower by skip shifting is possible (step S200: YES), the driver assist ECU 300 changes the shift speed of the transmission 25 to the shift speed Gx and sends to the TMECU 200 a command signal for prohibiting upshifting to a shift speed higher than the shift speed Gx (step S210). In response to the command signal received from the driver assist ECU 300, the TMECU 200 controls the hydraulic control device 28 such that the shift speed of the transmission 25 is changed to the shift speed Gx, and does not change the shift speed to a shift speed higher than the shift speed Gx until the prohibition of upshifting is canceled.

On the other hand, when the driver assist ECU 300 determines in step S200 that downshifting to two or more shift speeds lower by skip shifting is not possible (step S200: NO), the driver assist ECU 300 changes the shift speed of the transmission 25 to a shift speed G(n−1) that is one shift speed lower than the current shift speed G(n) and sends to the TMECU 200 a command signal for prohibiting upshifting to a shift speed higher than the shift speed G(n−1) (step S180). In this case as well, in response to the command signal received from the driver assist ECU 300, the TMECU 200 controls the hydraulic control device 28 such that the shift speed of the transmission 25 is changed to the shift speed G(n−1), and does not change the shift speed to a shift speed higher than the shift speed G(n−1) until the prohibition of upshifting is canceled. As shown in FIG. 3, even when the driver has released the accelerator pedal (the accelerator operation amount Acc is 0%) and is depressing the brake pedal, the vehicle speed $V_{ii-1}$ at which the rotational speed Ng(n−1) of the engine 10 at the shift speed G(i−1) that is one shift speed lower than each shift speed G(i) of the transmission 25 is made equal to or lower than the downshift permission maximum rotational speed Neb is sufficiently higher than the vehicle speed $U_{ii-1}$ at which the shift speed of the transmission 25 is changed to one shift speed lower according to the downshift line described above.

After step S180 or step S210, the driver assist ECU 300 determines whether an accelerator-on time that is a time period of driver's continuous depression of the accelerator pedal after prohibition of upshifting of the transmission 25 in step S140 is less than a predetermined time tref (e.g., 2 to 4 seconds) (step S220). The accelerator-on time is measured by a timer, not shown. In the case where the determination result is NO in step S110, S120, S130, S150, S170, or S190, the driver assist ECU 300 determines in step S220 whether the accelerator-on time is less than the predetermined time tref. When the driver assist ECU 300 determines in step S220 that the accelerator-on time is less than the predetermined time tref (step S220: YES), the driver assist ECU 300 determines whether the rotational speed Ne of the engine 10 obtained in step S100 is equal to or higher than a predetermined upshift prohibition cancellation rotational speed (second threshold) Nec (step S230). In the present embodiment, the upshift prohibition cancellation rotational speed Nec is a fixed value that is higher than the upshift prohibition maximum rotational speed Nea by, for example, about 100 rpm.

When the driver assist ECU 300 determines in step S230 that the rotational speed Ne of the engine 10 is lower than the upshift prohibition cancellation rotational speed Nec (step S230: NO), the driver assist ECU 300 terminates the routine of FIG. 2, and performs step S100 and the subsequent steps again when the next execution timing comes. When the driver assist ECU 300 determines in step S230 that the rotational speed Ne of the engine 10 is equal to or higher than the upshift prohibition cancellation rotational speed Nec (step S230: YES), the driver assist ECU 300 sends to the TMECU 200 a command signal for canceling the prohibition of upshifting of the transmission 25 (step S240) and terminates the routine of FIG. 2. When the driver assist ECU 300 determines in step S220 that the accelerator-on time is equal to or longer than the predetermined time tref (step S220: NO), the driver assist ECU 300 sends to the TMECU 200 a command signal for canceling the prohibition of upshifting of the transmission 25 (step S240) and terminates the routine of FIG. 2.

As a result of execution of the control routine of FIG. 2 as described above, the shift speed (speed ratio) of the transmission 25 of the vehicle 1 is maintained as the current shift speed G(n) (current speed ratio) on the condition that a deceleration factor such as a preceding vehicle or a curve that is present ahead of the vehicle 1 is detected by the radar sensor 31, the camera 32, and the driver assist ECU 300 that are the deceleration factor detection device. More specifically, in the case where (i) at least one of the degree of closeness of the vehicle 1 to the preceding vehicle and the speed at which the vehicle 1 enters the curve increases and (ii) the rotational speed Ne of the engine 10 is equal to or lower than the predetermined upshift prohibition maximum rotational speed (third threshold) Nea (time t1 in FIG. 4), the shift speed of the transmission 25 is maintained as the current shift speed G(n) due to the prohibition of upshifting even when an upshift condition for the transmission 25 is satisfied (see dashed line in FIG. 4). When deceleration is requested by the driver either releasing the accelerator pedal or releasing the accelerator pedal and depressing the brake pedal after detection of a deceleration factor ahead of the vehicle 1 (times t2, t3 in FIG. 4), the shift speed of the transmission 25 is changed to at least one shift speed lower (the downshift side) than the current shift speed G(n) regardless of whether a predetermined downshift condition for the transmission 25 (see dashed lines in FIGS. 3 and 4) is satisfied, and the changed shift speed is maintained due to the prohibition of upshifting.

This makes it possible to suppress a change of the shift speed of the transmission 25 to a lower shift speed by what is called power-on downshifting (see arrow in FIG. 4) when the vehicle 1 is reaccelerated after the deceleration factor ahead of the vehicle 1 disappears. Even when the driver assist ECU 300 erroneously perceives a deceleration factor although there is no deceleration factor ahead of the vehicle 1, the shift speed of the transmission 25 is maintained as the current shift speed G(n) unless deceleration of the vehicle is requested by the driver. This makes it possible to suppress an increase in deceleration even though deceleration of the vehicle is not requested by the driver. This configuration allows the vehicle 1 to be smoothly accelerated in response to a reacceleration request that is made after the deceleration factor ahead of the vehicle 1 disappears, and also does not make the driver feel discomfort when the deceleration factor is erroneously perceived. Moreover, since the shift speed of the transmission 25 is maintained as the current shift speed G(n) on the condition that the rotational speed Ne of the engine 10 is equal to or lower than the upshift prohibition maximum rotational speed Nea, this configuration makes it possible to avoid giving the driver a feel of discomfort by suppressing an increase in the rotational speed of the engine 10 due to the current shift speed G(n) being maintained.

In response to detection of a deceleration factor or a deceleration request from the driver, the shift speed of the transmission 25 of the vehicle 1 is changed to at least one shift speed lower than the current shift speed G(n) such that the rotational speed Ng(n−1) of the engine 10 etc. after the shift speed (speed ratio) is changed becomes equal to or lower than the predetermined downshift permission maximum rotational speed Neb (first threshold) (steps S180, S210). This makes it possible to satisfactorily avoid giving the driver a feel of discomfort by suppressing an excessive increase in the rotational speed of the engine 10 with the change in shift speed of the transmission 25 to a lower shift speed (downshift side).

In the case where a deceleration factor located ahead of the vehicle 1 is detected and also the driver releases the accelerator pedal while the vehicle 1 is traveling with the shift speed of the transmission 25 being higher than the downshift permission minimum shift speed, for example, the sixth speed, namely while the vehicle 1 is traveling at a vehicle speed at which the sixth speed is established (predetermined vehicle speed) or higher, the shift speed of the transmission 25 is changed to one shift speed lower than the current shift speed G(n) even when the driver is not depressing the brake pedal (steps S170, S180). This configuration is less likely to make the occupant of the vehicle 1 feel discomfort (excessive decelerating feel) due to engine braking and also allows a shift speed at which the vehicle 1 can be smoothly accelerated in response to a reacceleration request that is made after the deceleration factor ahead of the vehicle 1 disappears to be established, even when the driver subsequently depresses the brake pedal only for a short time.

On a predetermined condition including that the shift speed of the transmission 25 of the vehicle 1 is a high shift speed (in the present embodiment, the seventh speed and the eighth speed), the shift speed of the transmission 25 is changed to a minimum shift speed Gx at which the rotational speed Ng(n−2) of the engine 10 etc. is made equal to or lower than the downshift permission maximum rotational speed Neb by skip shifting in response to a deceleration request from the driver releasing the accelerator pedal and depressing the brake pedal (steps S190 to S210). This configuration allows a shift speed at which the vehicle 1 can be smoothly accelerated in response to a reacceleration request that is made after the deceleration factor ahead of the vehicle 1 disappears to be quickly established even when steps S170 and S180 are not performed because, for example, the driver depresses the brake pedal approximately simultaneously with releasing the accelerator pedal or even when the driver depresses the brake pedal only for a short time.

When the rotational speed Ne of the engine 10 of the vehicle 1 becomes equal to or higher than the upshift prohibition cancellation rotational speed (second threshold) Nec that is higher than the downshift permission maximum rotational speed (first threshold) Neb (step S230), the shift speed is no longer maintained by the prohibition of upshifting (step S240). This configuration makes it possible to avoid giving the driver a feel of discomfort by suppressing an increase in the rotational speed of the engine 10 due to the shift speed G(n−1) or Gx lower than the current shift speed G(n) being maintained.

In the case where the driver depresses the accelerator pedal for the predetermined time tref or longer after the shift speed of the transmission 25 of the vehicle 1 is maintained as the current shift speed G(n) due to the prohibition of upshifting in step S140 (step S220, time t4 to t5 in FIG. 4), the shift speed is no longer maintained by the prohibition of upshifting (step S240). This configuration makes it possible to suppress a change of the shift speed of the transmission 25 to a higher shift speed (upshift side) in the case where the driver assist ECU 300 erroneously perceives that the deceleration factor has disappeared before the driver makes a reacceleration request.

As described above, the vehicle 1 of the disclosure includes the engine 10, the transmission 25 that transmits power from the engine 10 to the drive wheels DW, and the radar sensor 31, the camera 32, and the driver assist ECU 300 which are the deceleration factor detection device for detecting a deceleration factor that is present ahead of the vehicle 1. The driver assist ECU 300 and the TMECU 200 that are the control device maintain the shift speed (speed ratio) of the transmission 25 as the current shift speed G(n) (current speed ratio) on the condition that a deceleration factor has been detected. The driver assist ECU 300 and the TMECU 200 change the shift speed to at least one shift speed lower than the current shift speed G(n) and maintain the changed shift speed, in response to a deceleration request from the driver. This configuration allows the vehicle 1 to be smoothly accelerated in response to a reacceleration request that is made after the deceleration factor ahead of the vehicle disappears, and also makes it possible to avoid giving the driver a feel of discomfort when a deceleration factor is erroneously perceived.

The transmission 25 of the vehicle 1 may be a mechanical continuously variable transmission (CVT). In this case, instead of changing the shift speed to at least one shift speed lower than the current shift speed G(n) in response to a deceleration request from the driver, the speed ratio is changed stepwise to the lower speed side than the current speed ratio (downshift side) such that the rotational speed of the engine 10 after the speed ratio is changed becomes equal or lower than the downshift permission maximum rotational speed (first threshold) Neb. The vehicle 1 may include an electric motor that outputs driving torque (assist torque) to the crankshaft 11 of the engine 10 or the input shaft 26 of the transmission 25.

The disclosure is not limited to the above embodiment, and various modifications can be made without departing from the spirit and scope of the disclosure. The above embodiment is merely one specific form of the disclosure described in the section "SUMMARY" and is not intended to limit the elements of the disclosure described in "SUMMARY."

The disclosure can be used in the vehicle manufacturing industry etc.

What is claimed is:
1. A vehicle, comprising:
an engine;
a transmission configured to transmit power from the engine to a drive wheel;
a deceleration factor detection device configured to detect a deceleration factor that is present ahead of the vehicle; and
an electronic control unit configured to:
determine whether the deceleration factor has been detected by the deceleration factor detection device;
in a case that the deceleration factor has been detected by the deceleration factor detection device, determine whether a driver subsequently issues a deceleration request;
prohibit an upshift of the transmission on condition that the deceleration factor is detected by the deceleration factor detection device; and
change a speed ratio of the transmission stepwise to a lower speed side than a current speed ratio and maintain the changed speed ratio, in the case that deceleration factor is detected by the deceleration factor detection device and the driver subsequently issues the deceleration request.

2. The vehicle according to claim 1, wherein the electronic control unit is configured to change the speed ratio stepwise to the lower speed side than the current speed ratio such that a rotational speed of the engine after the speed ratio is changed becomes equal to or lower than a predetermined first threshold.

3. The vehicle according to claim 2, wherein:
the transmission is a stepped transmission and the speed ratio is a shift speed of the transmission; and
the electronic control unit is configured to:
   maintain the shift speed of the transmission as a current shift speed on the condition that the deceleration factor is detected by the deceleration factor detection device;
   change the shift speed to at least one shift speed lower than the current shift speed regardless of whether a predetermined downshift condition is satisfied, in response to the deceleration request from the driver; and
   maintain the changed shift speed.

4. The vehicle according to claim 3, wherein the electronic control unit is configured to change the shift speed to a minimum shift speed at which the rotational speed of the engine is equal to or lower than the first threshold, in response to the deceleration request that is made by the driver under a predetermined condition.

5. The vehicle according to claim 2, wherein the electronic control unit is configured to terminate prohibition of the upshift of the transmission when the rotational speed of the engine becomes equal to or higher than a second threshold after the speed ratio is maintained as the current speed ratio, the second threshold being higher than the first threshold.

6. The vehicle according to claim 5, wherein the electronic control unit is configured to prohibit the upshift of the transmission on condition that the rotational speed of the engine is equal to or lower than a third threshold when the deceleration factor is detected by the deceleration factor detection device, the third threshold being higher than the first threshold and lower than the second threshold.

7. The vehicle according to claim 2, wherein the electronic control unit is configured to terminate prohibition of the upshift of the transmission when the driver depresses an accelerator pedal for a predetermined time or longer after the prohibition of the upshift of the transmission is started.

8. The vehicle according to claim 1, wherein the deceleration request is depression of a brake pedal by the driver.

9. The vehicle according to claim 1, wherein the deceleration request is release of an accelerator pedal by the driver.

10. A method for controlling a vehicle including an engine, a transmission configured to transmit power from the engine to a drive wheel, and a deceleration factor detection device configured to detect a deceleration factor present ahead of the vehicle, the method comprising:
   determining whether the deceleration factor has been detected by the deceleration factor detection device;
   in a case that the deceleration factor has been detected by the deceleration factor detection device, determine whether a driver subsequently issues a deceleration request;
   prohibiting an upshift of the transmission on condition that the deceleration factor is detected by the deceleration factor detection device; and
   changing a speed ratio of the transmission stepwise to a lower speed side than a current speed ratio and maintaining the changed speed ratio, in the case that deceleration factor is detected by the deceleration factor detection device and the driver subsequently issues the deceleration request.

* * * * *